United States Patent
Bibby

(10) Patent No.: US 9,702,413 B2
(45) Date of Patent: Jul. 11, 2017

(54) FRICTION CLUTCH ASSEMBLY

(75) Inventor: Damian Bibby, Greensborough (AU)

(73) Assignee: Clutch Industries Pty Ltd (AU)

( * ) Notice: Subject to any disclaimer, the term of this patent is extended or adjusted under 35 U.S.C. 154(b) by 114 days.

(21) Appl. No.: 14/400,961

(22) PCT Filed: May 31, 2012

(86) PCT No.: PCT/AU2012/000610
§ 371 (c)(1),
(2), (4) Date: Feb. 12, 2015

(87) PCT Pub. No.: WO2013/170288
PCT Pub. Date: Nov. 21, 2013

(65) Prior Publication Data
US 2015/0240881 A1    Aug. 27, 2015

(30) Foreign Application Priority Data

May 14, 2012 (AU) ................................ 2012901974

(51) Int. Cl.
*F16F 15/123* (2006.01)
*F16D 13/64* (2006.01)
(Continued)

(52) U.S. Cl.
CPC .......... *F16D 13/686* (2013.01); *F16D 13/64* (2013.01); *F16F 15/00* (2013.01); *F16F 15/13423* (2013.01); *F16D 2300/22* (2013.01)

(58) Field of Classification Search
CPC .... F16D 2300/12; F16D 13/64; F16D 13/686; F16F 15/00–15/13423
See application file for complete search history.

(56) References Cited

U.S. PATENT DOCUMENTS 2,742,992 A * 4/1956 Timm ................... F16D 13/64
192/107 C
4,679,679 A * 7/1987 Lech, Jr. ............. F16F 15/1218
192/213
(Continued)

FOREIGN PATENT DOCUMENTS

DE          19958813 A1   12/2000
DE    102007016744 A1   10/2008
(Continued)

OTHER PUBLICATIONS

International Search Report for Application No. PCT/AU2012/000610 dated Jul. 9, 2012.
(Continued)

*Primary Examiner* — Ramya Burgess
*Assistant Examiner* — Lillian Nguyen
(74) *Attorney, Agent, or Firm* — Lerner, David, Littenberg, Krumholz & Mentlik, LLP

(57) ABSTRACT

A clutch plate including first and second plates with the first plate having a friction material applied about its peripheral edge. A hub for connection to an output shaft and having a hub flange. The first and second plates being angularly displaceable relative to each other and being coupled by at least two drive springs. A sleeve extends about a portion of each of the drive springs so that a portion of each of the drive springs extends out of the sleeve. The sleeve being interposed between a radially outer surface of the springs and a facing bearing surface formed by the plates. The arrangement is such that during compression of the springs, the springs are moveable within the sleeves relative to the sleeves and the sleeves are moveable relative to the bearing surface of the plates.

15 Claims, 6 Drawing Sheets

(51) Int. Cl.
*F16D 13/68* (2006.01)
*F16F 15/00* (2006.01)
*F16F 15/134* (2006.01)

(56) References Cited

U.S. PATENT DOCUMENTS

| | | | | |
|---|---|---|---|---|
| 4,702,721 | A | * | 10/1987 | Lamarche ......... F16F 15/12313 192/212 |
| 4,903,803 | A | * | 2/1990 | Koshimo .......... F16F 15/12326 192/205 |
| 5,711,407 | A | | 1/1998 | Maier |
| 6,047,804 | A | * | 4/2000 | Feldhaus ........... F16F 15/13178 192/213.2 |
| 6,083,107 | A | * | 7/2000 | Herbst ................ F16F 15/1238 192/204 |
| 6,371,857 | B1 | | 4/2002 | Kono et al. |
| 6,575,838 | B2 | * | 6/2003 | Jackel ................ F16F 15/1343 192/205 |
| 8,932,142 | B2 | * | 1/2015 | Takikawa .................. F16D 3/66 464/64.1 |
| 2012/0077605 | A1 | * | 3/2012 | Nakagaito ................. F16D 3/12 464/68.8 |
| 2012/0208648 | A1 | * | 8/2012 | Takikawa ................ F16H 45/02 464/68.8 |
| 2013/0098731 | A1 | * | 4/2013 | Verhoog ........... F16F 15/12366 192/207 |

FOREIGN PATENT DOCUMENTS

| | | |
|---|---|---|
| EP | 0120582 A2 | 10/1984 |
| JP | 2010084808 A | 4/2016 |
| WO | 2012011428 A1 | 1/2012 |
| WO | 2012119179 A1 | 9/2012 |

OTHER PUBLICATIONS

Extended European Search Report for Appln No. EP 12877014.6 dated Apr. 18, 2016, 9 pages.
Chinese Office Action and Search Report for Application No. 201280074056.0 dated Nov. 28, 2016.

* cited by examiner form
FRICTION CLUTCH ASSEMBLY

CROSS REFERENCE TO RELATED APPLICATIONS

The present application is a national phase entry under 35 U.S.C. §371 of International Application No. PCT/AU2012/000610, filed May 31, 2012, which claims priority from Australian Patent Application No. 2012901974, filed May 14, 2012, all of which are hereby incorporated herein by reference.

FIELD OF THE INVENTION

The present invention relates to a friction clutch assembly, principally for use in the automotive sector, for manual transmission cars and trucks. The present invention is particularly directed to the clutch plate of a clutch assembly and it will be convenient to describe the invention as it relates to that application.

BACKGROUND OF THE INVENTION

A friction clutch assembly or "clutch" of a car or other automobile having a manual transmission is generally located between the engine and the drive train. The assembly normally includes several adjacent annular plates, including a flywheel that is rotatably driven by the engine output (a crank shaft usually), a clutch plate (otherwise known as a driven plate), and a pressure plate that is biased by energy storing devices, such as one or more springs, towards the clutch plate and flywheel to clamp the clutch plate between the flywheel and the pressure plate.

The frictional engagement of the coupling faces of the clutch plate with the adjacent rotating coupling faces of the flywheel and the pressure plate allow the clutch plate to transfer power generated by the engine to the remainder of the drive train. However, unless there is some form of dampening in the drive line to dissipate the irregular impulses of the internal combustion petrol or diesel engine, these impulses will create unwanted driveline noise.

To prevent transmission of engine impulses through to the gearbox, clutch plates include drive springs for dampening purposes. The drive springs are typically coil springs. Thus, a typical clutch plate includes a splined hub that accepts a splined shaft to transmit engine rotation to the gearbox or transmission. The splined hub is connected to a hub flange, either rigidly or with some angular displacement for idle vibration dampening, and the hub flange is sandwiched between a main plate and a side plate which are fixed together. The hub flange is driven to rotate when the main plate is shifted into engagement with the flywheel of an engine through a friction material fixed to the circumferential edge of the main plate, The main and side plate assembly (hereinafter the "plate assembly") and the hub flange are connected by drive springs to provide limited angular displacement between them. The angular displacement is provided to dampen torsional vibration in the drive mode of the vehicle (as compared to other vibration such as idle vibration).

The amount of dampening available is increased as the length of the drive springs increases. Therefore to increase the available dampening, the amount of angular displacement available between the hub flange and the plate assembly also must increase. Traditionally, drive springs are straight springs, and in the past, normally 3 or 4 springs are provided, spaced equidistantly about the splined hub. The preference for using straight coil compression springs arises on the basis that they are easy to manufacture and are therefore inexpensive. Straight drive springs have also been preferred to date because such drive springs can also operate without the need for guides along their length, to maintain them straight. This has the consequential benefits that the springs do not rub on other components of the clutch assembly, which would otherwise cause wear and generate heat, both of which can be detrimental to the life of the clutch plate.

The benefits of using straight coil compression springs as drive springs dissipate as attempts are made to provide a wider angle of displacement between the hub flange and the plate assembly. As indicated above, the length of the coil springs affects the amount of dampening which can be achieved. However, as the length of a straight drive spring is increased, the spring load can move out of alignment with the axis of the spring and that can reduce the normal compressive strength of the spring. The spring can actually be forced into a trapezoidal shape by the hub flange acting against the side and main plates of the clutch plate.

Applicant has previously recognised that benefits might be achieved by the adoption of curved drive springs in a clutch plate to increase the length of the drive springs. However, applicant also recognises that when curved drive springs are used to transmit engine torque, the springs are naturally forced radially outwards, bringing them into engagement with other parts of the clutch plate, including the clutch plate housing, causing them to rub against those parts. That rubbing can cause heat, wear, noise, erratic torque dampening and premature failure of the springs.

The present invention seeks to provide a clutch plate which has improved angular displacement between the hub flange and the plate assembly, compared to prior art clutch plates.

SUMMARY OF THE INVENTION

According to the present invention there is provided a clutch plate including:

a plate assembly comprising axially spaced first and second plates and having an annular periphery extending from the first plate to which an assembly of friction material is applied to face in each of opposite directions, a hub for connection to an output shaft, a hub flange positioned between the first and second plates and being drivable by the plate assembly to rotate, the hub being drivable to rotate by the hub flange, the plate assembly and the hub flange being angularly displaceable relative to each other within a predetermined range and being coupled together by at least two drive springs, which are positioned equidistantly about the hub, the drive springs being curved compression coil springs having a substantially constant radius of curvature and being mounted concentric about the hub, the drive springs being at least partly positioned between the first and second plates, each end of the drive springs being in engagement with an abutment of the hub flange and an abutment of the plate assembly, the drive springs applying a biasing load against relative angular displacement between the plate assembly and the hub flange, a sleeve extending about or along a portion of the length of each of the drive springs so that a portion of each of the drive springs extends out of or from the sleeve, and the sleeve being interposed between a radially outer surface of the spring and a facing bearing surface formed by the plate assembly, the springs being movable within the sleeves relative to the sleeves and the sleeves being movable relative to the bearing surfaces of the plate assembly.

The present invention also provides a clutch in which the clutch plate described above is employed.

The clutch plate according to the present invention includes a sleeve which is moveable relative to the bearing surface of the plate assembly, and which also allows movement of the spring relative to the sleeve. This two-stage movement provides a unique arrangement in which the sleeve protects the spring from rubbing engagement with other parts of the clutch plate, but still allows curved drive springs to be used and to function properly.

It is an important characteristic of the invention, that the sleeve provide the two forms of movement described above, i.e. that the sleeve itself be moveable relative to the bearing surface of the plate assembly, and the drive spring be moveable relative to the sleeve. These two forms of movement maximise the efficiencies that the sleeve provides and provides a very unique arrangement not known in the prior art.

The benefit of the two forms of movement discussed above includes that the sleeve slides relative to and in contact with the bearing surface as the drive spring is compressed and expanded from compression. As an example, a curved drive spring of the invention can, in some forms of the invention, have a maximum compression through an arc of 30°. Taking that amount of compression as an example, in a drive mode of the clutch plate one end of the drive spring (the driven end) moves through 30°, and the opposite end remains stationary. Intermediate sections of the spring move different amounts depending on their proximity to the driven end of the drive spring or the opposite end.

In addition to the movement discussed above, when the drive spring is compressed, each individual coil of the drive spring moves relative to an adjacent coil.

By the use of the sleeve discussed above, the sleeve moves with the spring relative to the plate assembly as the spring compresses. In the example of 30° spring movement, the sleeve can move through the same arc and therefore also traverse through 30°. In this movement, the drive spring and the plate assembly are separated by the sleeve and by careful selection of the sleeve material (discussed later herein), the movement can be low friction.

Moreover, the spring coils move within the sleeve relative to each other and again, by careful selection of the sleeve material, spring coil movement can also be low friction. Coil movement within the sleeve is much smaller than overall movement of the spring relative to the plate assembly. The coils can for example move towards and away from each other between 1 to 3 mm.

The benefits of this arrangement are that wear that would otherwise occur by relative movement between the spring and the plate assembly is avoided because there is no contact between the spring and the plate assembly. Rather, there is low friction sliding engagement between the sleeve and the plate assembly. Further, the sleeve material advantageously can also be selected for minimal wear and heat generation.

Internally of the sleeve, relative movement between the coils and the sleeve is also low friction, low wear and low heat generating.

The use of the sleeve will also reduce or eliminate noise and vibration associated with spring movement relative to the plate assembly, including shuddering during compression and expansion.

The use of the sleeve according to the invention can have other advantages, in particular that the current use of stop pins for safety overload of the clutch plate can be removed and their function taken by the sleeve. The sleeve of the present invention can thus form a stop surface and thus provide a dual function allowing both the adoption of a curved drive spring enabling greater angular displacement between the plate assembly and the hub flange, and eliminating the need for stop pins. Significant advantages can be provided by this new arrangement.

To maximise the advantages provided by the sleeve, the sleeve is preferably made of a material that has a low coefficient of friction for each of the surfaces that come into contact with the drive spring and the bearing surface of the plate assembly. Other preferable characteristics for the sleeve include that it be of sufficient hardness and strength to absorb the force and movement of the spring, and that it be capable of handling heat generated by the relative movement of the drive springs and the bearing surface, and by other components of the clutch assembly, including heat generated by the friction material of the clutch plate rubbing on the fly wheel and the pressure plate. Suitable materials include high temperature plastics, metal bearing materials such as bronze, white metal or similar, graphite/metal alloys, graphite/bronze alloys, iron or copper graphite alloys, or ceramics. These are example materials and do not constitute and exhaustive list.

In a sleeve according to the invention, the cross-section of the sleeve can be generally U-shaped with the open end facing radially inwardly. Other cross-sectional shapes could alternatively apply.

Each sleeve can have a curved inner surface which is curved at substantially the same radius of curvature as the outer surface of the coils of the spring so that there is close surface to surface contact between the outer surface of the coils of the spring and the inner surface of the sleeve. That contact can take place through any suitable angle and for example, the curved inner surface can extend from the radially outermost point of the coils of the springs for at least 45° on either side of the radially outermost point so that the curved inner surface extends for a total of 90°, or it can extend for up to 90° so that the curved inner surface extends for a total of 180°. The latter arrangement is preferred to provide maximum protection for the spring and adjacent components and/or surfaces of the clutch plate. The sleeve can extend beyond the curved section described above and can for example include straight walls which extend from the curved sections on either side of the sleeve.

The bearing surface of the plate assembly can be a concave surface and in some forms of the invention, the bearing surface has a base surface and a pair of diverging wall surfaces. The base surface can extend substantially tangentially to the radially outermost point of the coils of the springs and the diverging wall surfaces can extend from the base surface at approximately 60°. In this form of the invention, the facing surface of the sleeve can be formed substantially the same so that there is close surface to surface contact between the outer surface of the sleeve and the bearing surface.

The bearing surface can be formed partially by the first and second plates, whereby one of the diverging wall surfaces is formed by the first plate and the base and the other of the diverging wall surfaces is formed by the second plate, or the bearing surface can be formed in a symmetrical manner whereby each of the first and second plates forms both a diverging wall surface and a portion of the base surface.

In a clutch plate according to some forms of the invention, each drive spring can be formed by first and second curved coil springs which can be of different or substantially the same length. The springs can be of constant radius of curvature and arranged in series, and the first and second curved springs can be separated by a straight spring of relatively short length compared to the first and second curved springs, so that the drive spring formed by the first and second curved springs and the straight spring is of substantially constant radius of curvature. Each of the curved springs can be of low torque rating relative to the straight spring. For example, the first and second curved springs can each have a torque rating of 6 Nm/Deg, while the straight spring can have a torque rating of 26 Nm/Deg. Alternatively, the first and second curved springs can each have a torque rating of 3 Nm/Deg, while the straight spring can have a torque rating of 13 Nm/Deg. Of course any suitable torque ratings can be employed so that the above values are provided for illustrative purposes only.

In the above forms of the invention, the sleeve of each drive spring can be formed in two sleeve portions of which a first sleeve portion is disposed about or along a portion of the length of the first curved spring and the second sleeve portion is disposed about or along a portion of the length of the second curved spring. The sleeve portions can be of equal length.

The first and second sleeve portions can include an inwardly extending projection which is located between facing ends of the first and second curved springs and the straight spring to locate the sleeve portions relative to the drive spring. The inwardly extending projections can be sandwiched between the ends of the straight spring and the facing ends of the first and second curved springs to maintain the sleeve portions in place, or the inwardly extending projections can be otherwise located between the facing spring ends. Each inwardly extending projection could for example include a spigot or boss that extends into the interior of one or both of the straight or curved springs between which the projection extends for locating purposes. The use of an inwardly extending projection can be used in the sleeve portions as discussed above or it can be used in other forms of sleeve in other forms of the invention.

In the above described forms of the invention, a portion of each of the first and second curved springs extends out of the sleeve portions at the ends of the first and second curved springs remote from the straight spring. The first and second curved springs can be compressed to allow angular displacement between the plate assembly and the hub flange until the portion of the springs that extend out of the sleeve portions is fully accommodated within the sleeve portions where after no further compression of the springs takes place. As an example only, in some forms of the invention, the first and second curved springs provide a maximum of about 12° of compression each, although it should be appreciated that more or less compression can be provided as required by suitable spring and sleeve construction.

The straight spring can compress as the first and second curved springs compress, but because the straight spring is of a higher torque rating than the first and second curved springs, those springs will commence compression in advance of the straight spring. The straight spring can provide a maximum of about 6° of compression, although again it should be appreciated that more or less compression can be provided as required.

The inwardly extending projection of each sleeve portion can include an abutment, spigot or boss and the respective abutments of each projection can be aligned for abutment upon a predetermined compression of the straight spring. By this and other arrangements discussed herein, the use of prior art stop pins can be eliminated by this abutment arrangement. The abutments can extend on the outside of the straight spring or into the straight spring, such as into the centre of the straight spring.

The sleeve portions terminate prior to the ends of the first and second curved springs remote from the straight spring and an end sleeve can be applied to the ends of the first and second curved springs remote from the straight spring. The end sleeve terminates at a position spaced from the sleeve portion of each of the first and second curved springs so that a portion of each of the first and second curved springs remains available for compression. That spacing reduces as the first and second curved springs are compressed. The sleeve portions and the end sleeve can be arranged to engage or abut to terminate further compression. In that form of the invention, stop pins can be omitted. Alternatively, stop pins can be employed so that the spring compression is terminated at a position in advance of abutment between the sleeve portions and the end sleeves.

The end sleeves can also provide location of the springs ends remote from the straight spring to seat the spring ends against sliding or other movement relative to the hub flange or the plate assembly. End sleeves can be employed with the drive springs of all forms of the invention.

In alternative forms of the invention, each drive spring can be formed by a first curved spring and a second straight spring, whereby the straight spring is of relatively short length compared to the curved spring, and the curved spring is of low torque rating relative to the straight spring. The drive spring formed in this manner remains of substantially constant radius of curvature despite the inclusion of the straight spring. The sleeve of each drive spring includes an inwardly extending projection which is located between facing ends of the curved spring and the straight spring to locate the sleeve and a portion of the curved spring extends out of the sleeve at the end of the sleeve remote from the straight spring for compression.

In this form of the invention, the first curved spring can provide a maximum of about 20° of compression and the straight spring can provide a maximum of about 10° of compression.

The straight springs of the forms of the invention discussed above can have a length in the region of 20 to 30 mm. In the forms of the invention in which a single curved spring is combined with a straight spring, the curved spring can have a length in the region of 70 to 100 mm, while in the forms of the invention in which a pair of curved springs is combined with a straight spring, the curved springs can have a length in the region of 40 to 60 mm. In all of these examples, the spring lengths are dependent on the size of the clutch plate and the examples given are given for clutch plates that have a maximum diameter in the region of about 200 to 250 mm.

In further alternative forms of the invention, the drive springs can each be formed by a single curved spring and each sleeve can be disposed substantially centrally of the length of the spring with opposite ends of the spring extending from the sleeve. The length of the opposite ends of the spring that extend from the sleeve can be substantially equal and the sleeve can be anchored to the spring by an inwardly extending projection and in some forms, the projection can include an inwardly opening groove which accepts a portion of a coil of the spring, such as a radially outer portion of the coil.

In further alternative forms of the invention, the drive springs can be formed by a single spring and each sleeve can be formed in two sleeve portions each of which extends from opposite ends of the curved spring towards the other but terminates prior to the other so that a portion of the drive spring extends out of each of the sleeve portions. In this form of the invention, the portion of the drive spring that extends out of each of the sleeve portions can be a substantially central spring portion.

In further alternative forms of the invention, the drive springs can be formed by first and second curved springs which are of substantially the same constant radius of curvature, whereby the first spring can have a high torque rating spring relative to the second spring. In this form of the invention, the sleeve can include an inwardly extending abutment of the any of the kinds discussed above against which facing ends of the first and second curved springs abut to sandwich or otherwise locate the sleeve in place and opposite ends of the first and second curved springs extend from the sleeve for compression.

In each of the forms of the invention discussed above, the sleeves can form a stop arrangement for terminating compression of the drive springs or stop pins can be used in the conventional manner.

BRIEF DESCRIPTION OF THE DRAWINGS

In order that the invention may be more fully understood, some embodiments will now be described with reference to the figures in which:

FIG. 4 is a cross-sectional view taken through IV-IV of FIG. 1a.

DETAILED DESCRIPTION OF THE DRAWINGS

Figure 1:
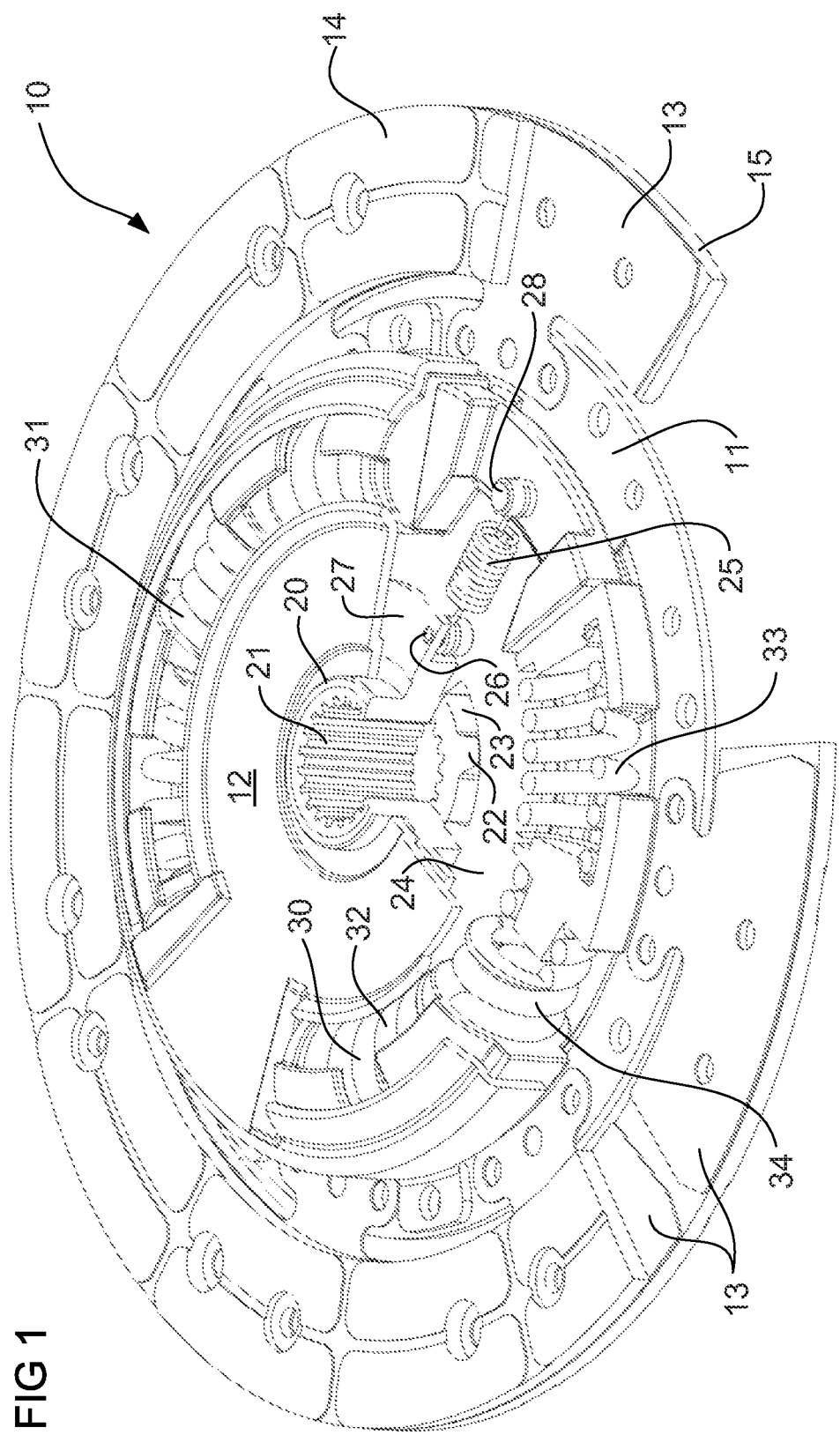
FIG. 1 is a perspective view of a clutch plate 10 according to the invention.

With reference to the figures, a clutch plate 10 is illustrated. The clutch plate 10 includes main and side plates 11 and 12, a plurality of facing segments 13 which are fixed to the main plate 11, and friction facings 14 and 15 which are fixed to each side of the facing segments 13. The technique of fixing the facing segments 13 to the main plate 11 is well known. Likewise, the technique for fixing the friction facings 14 and 15 to the facing segments 13 is also well known.

The clutch plate 10 includes a hub 20, which includes an internally splined surface 21. The internal surface 21 is sized to accept a complementary splined shaft (not shown) which connects to a vehicle transmission or gearbox. The spline connection between the hub 20 and the shaft allows axial movement of the shaft relative to the hub 20, but constrains the shaft to rotate with the hub 20 when the hub 20 is rotated.

FIG. 1 includes a cross-sectional portion to show that the hub 20 further includes a plurality of teeth 22 that extend about the hub 20 and which mesh with recesses 23 formed in a hub flange 24. Each tooth 22 is received within a recess 23 and by this arrangement, the hub 20 can rotate through a limited angular displacement relative to the hub flange 24 for the purpose of vibration dampening as is discussed below.

A radial tension spring 25 is anchored at one end to a rivet 26 extending through a flange 27 of the hub 20 and at its opposite end to a rivet 28 which is fixed to the hub flange 24. It will be appreciated, that by the arrangement of the teeth 22 and the recesses 23, the hub 20 and thus the annular flange 27 of the hub 20 can rotate relative to the hub flange 24. The respective rivets 26 and 28 can thus also shift relative to one another and thus the radial tension spring 25 can oscillate through an arc as it extends and contracts. It will further be appreciated, that as the relative movement takes place, the radial tension spring 25 exerts a biasing influence between the flange 27 and the hub flange 24, which progressively increases as the relative movement increases. The bias of the radial tension spring 25 tends to return the hub 20 and the hub flange 24 back to a home position when there is no torsional load on the clutch plate 10.

The use of a radial tension spring of the form illustrated in FIG. 1 is to provide dampening for noise that is known in the industry as "gear rollover noise" and that use is described in detail in applicants pending application PCT/AU2011/000807. The content of that application is fully incorporated herein by cross-reference. No further reference to the radial tension spring and its operation will be made herein.

Figure 1A:
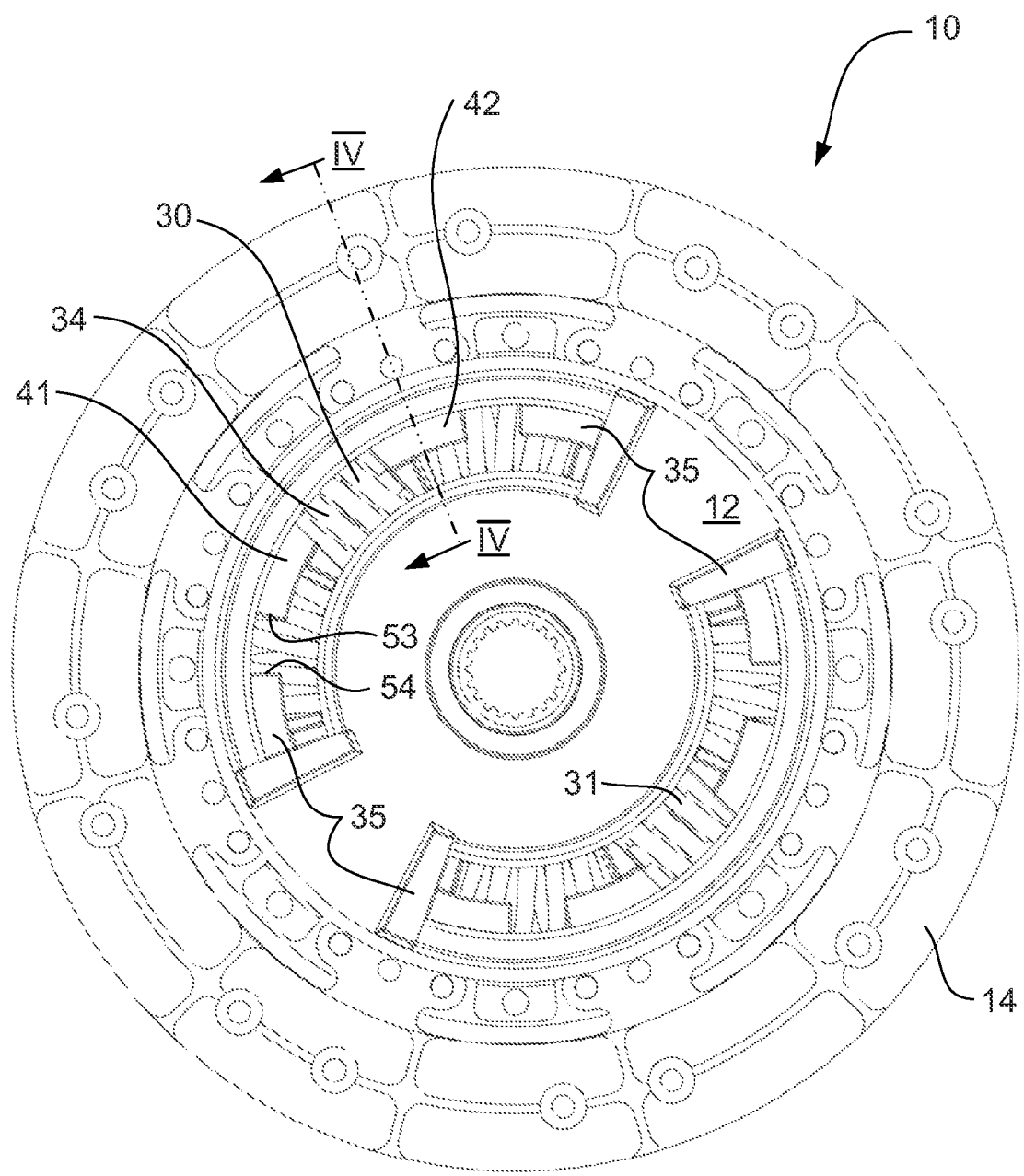
FIG. 1a is a plan view of the clutch plate of FIG. 1.
Figure 2:
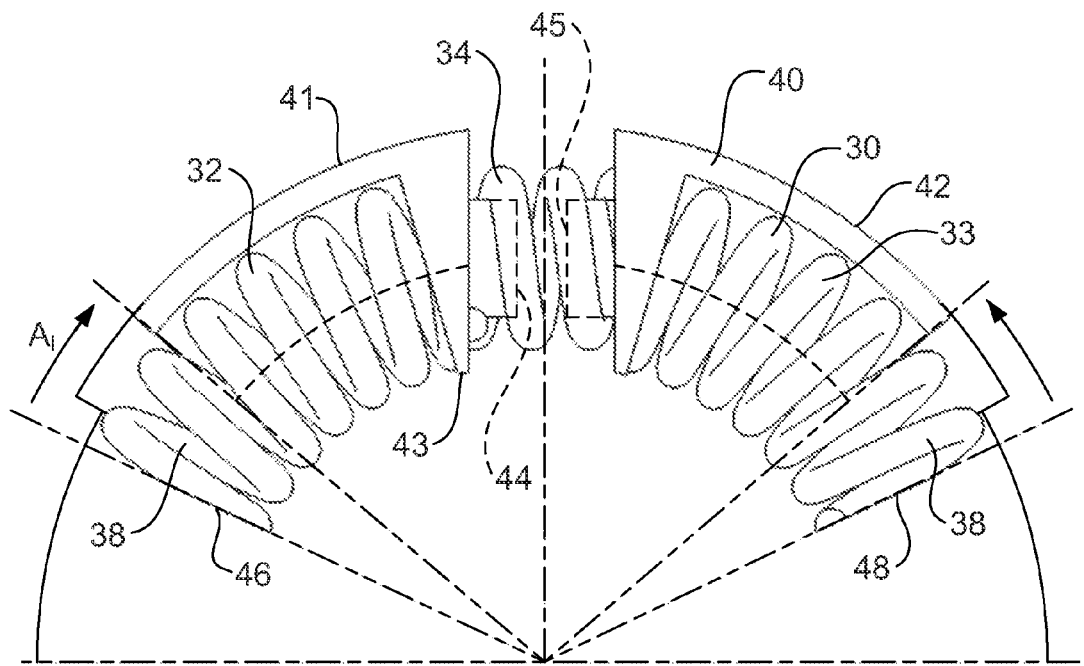
FIG. 2 is a schematic drawing of a drive spring arrangement according to the invention.

FIG. 1 also illustrates curved drive spring arrangements 30 and 31. The drive spring arrangements 30, 31 are formed from first and second curved springs 32 and 33 which are of substantially the same length and which are of constant radius of curvature. The first and second curved springs 32 and 33 are separated by a straight spring 34. The length of the straight spring relative to the first and second curved springs is such that the curved drive spring arrangements 30 and 31 remain of substantially constant radius of curvature. The first and second curved springs 32 and 33 are low torque rating springs, while the straight spring 34 is a high torque rating spring. The first and second curved springs 32 and 33 are significantly longer than the straight spring 34. A plan view of the arrangement of FIG. 1 is shown in FIG. 1a. A schematic plan view of part of the drive spring arrangement 30 of FIG. 1 is illustrated in FIG. 2. FIG. 2 illustrates the drive spring 30 of FIG. 1 in schematic plan view with sleeves 40 and 41 applied.

In FIG. 2, the first and second curved springs 32 and 33 are seen to have substantially the same length and radius of curvature. Moreover, FIG. 2 illustrates the straight spring 34 as being significantly shorter than the first and second curved springs 32 and 33. The FIG. 2 arrangement has a substantially constant radius of curvature despite the section of straight spring.

FIG. 2 also illustrates a sleeve 40 which is formed in two sleeve portions 41 and 42, of which the first portion 41 is disposed about a portion of the length of the first curved spring 32 and the second portion 42 is disposed about a portion of the length of the second curved spring 33. The sleeve portions 41 and 42 extend for the full height of the springs 32 and 33 although extension for a lesser height is acceptable.

Figure 3:
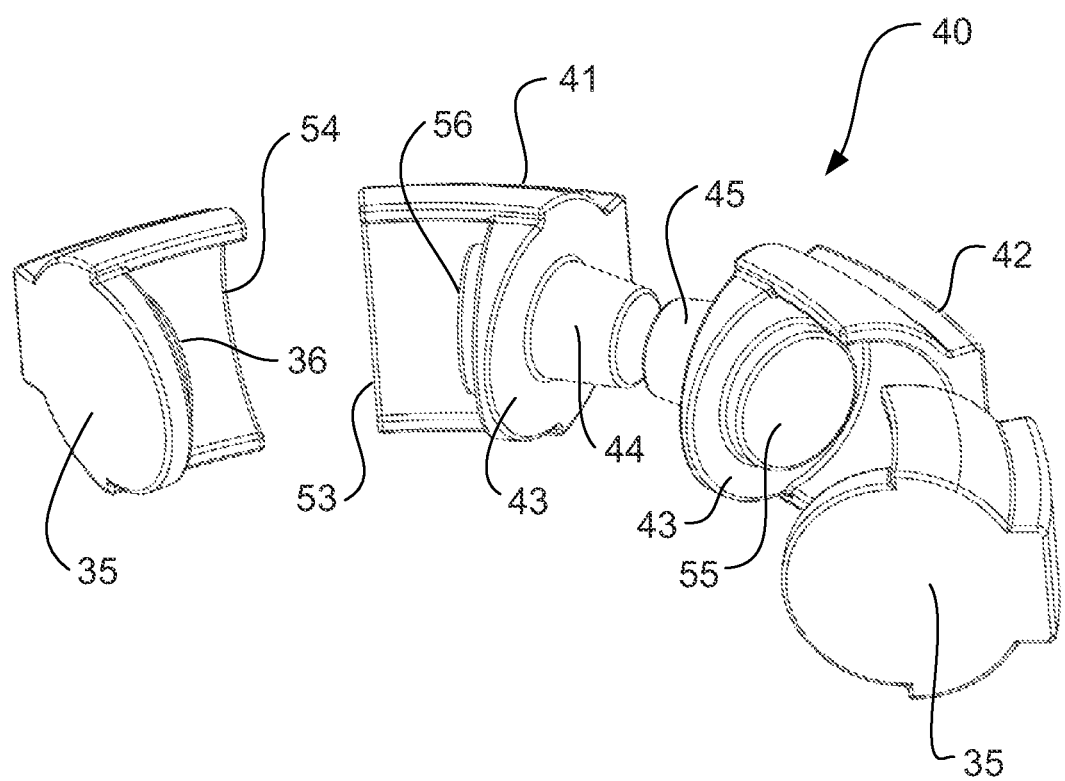
FIG. 3 shows an exploded view of a sleeve arrangement according to the invention.

FIG. 3 illustrates the sleeve portions 41 and 42 in perspective view and in isolation and that figure also illustrates the end sleeves 35 of FIG. 1. From FIG. 3, the sleeve portions 41 and 42 can be seen to be U-shaped in cross-section and including an inwardly extending abutment 43 at one end for interposition between facing ends of the springs 32 and 33, and the spring 34 (see FIG. 2). The abutments also include respective bosses 44 and 45 that are positioned for facing engagement for terminating compression of a respective spring 32 or 33 upon a predetermined loading (usually a severe or maximum loading) of the spring arrangement 30. Smaller and oppositely extending bosses 55 and 56 extend into the ends of the springs 32 and 33 for locating the sleeve portions 41 and 42 relative to the springs 32 and 33.

Returning to FIG. 2, a portion of each of the first and second curved springs 32 and 33 extends out of the sleeve portions 41 and 42 at the ends of the first and second curved springs 32 and 33 opposite the straight spring 34. In the arrangement shown, the ends 46 and 48 of the curved springs 32 and 33 are in engagement with abutments of the hub flange 24 and the main and side plates 11 and 12 (the abutments are not shown) and relative movement between the abutments against the ends 46 and 48 provide for compression or expansion of the drive spring 30.

Upon compression of the drive spring 30 in a clockwise drive direction, each of the spring 32, 33 and 34 will compress with the springs 32 and 33 compressing a greater amount than the spring 34 given the different torque ratings of the springs 32 to 34. As the springs 32 and 33 compress, they will move internally of and relative to the sleeves 41 and 42 to move into the sleeves. Once the springs 32 and 33 have been compressed to be fully within the sleeves 41 and 42, no further compression of those springs is available. In addition, as the springs 32 and 33 compress, the sleeves 41 and 42 will move or slide relative to the plate assembly. By careful selection of the material of the sleeves 41 and 42, the sliding movement will be quiet and low friction. Moreover, the springs 32 and 33 will be protected from rubbing against the plate assembly.

The ability of the springs to move within the sleeves and the sleeves to move or slide relative to the plate assembly is important and provides a unique arrangement not known in the prior art.

In FIG. 2, the bosses 44 and 45 are spaced apart permitting compression of the straight spring 34. Major compression of the straight spring 34 will not occur until the springs 32 and 33 have been compressed to be fully within the sleeves 41 and 42. Termination of compression of the straight spring 34 will occur when the bosses 44 and 45 abut, although that abutment will occur only under extreme loading. The bosses 44 and 45 also operate to locate the straight spring 34 relative to the sleeve portions 41 and 42 and to the first and second curved springs 32 and 33.

FIGS. 1 and 1a illustrate the end sleeves 35 which are illustrated in isolation in FIG. 3 and show them fixed to the ends of the curved springs 32 and 33 for locating the spring ends relative to the abutments of the hub flange 24 and the main and side plates 11 and 12. The end sleeves 35 assist to locate the ends of the curved springs on the abutments against sliding or other movement relative to the abutments. The end sleeves 35 include inwardly facing bosses 36 that extend into the springs 32 and 33 to locate the end sleeves 35 relative to the springs 32 and 33.

The end sleeves 35 are arranged to abut the sleeve portions 41 and 42 upon the maximum predetermined compression of the springs 32 and 33. The abutment faces are shown in FIG. 1a and comprise faces 53 and 54. This arrangement, like others described herein can operate without conventional stop pins, as engagement between the abutment faces 53 and 54 can operate in place of stop pins.

It will be appreciated that the FIG. 1 embodiment differs from the FIG. 2 embodiment by the addition in FIG. 1 of the end sleeves 35, which are not shown in FIG. 2.

In FIG. 2, the portion 38 of each of the first and second curved springs 32 and 33 that extends out of the sleeve portions 41 and 42 is sufficient to provide in the example shown, for a 12° compression of the springs 32 and 33. As indicated earlier, greater or lesser compression can be provided as required.

As shown by the arrow $A_1$ in relation to spring 32, once the 12° of compression has been made, the spring 32 will be entirely within the sleeve portion 41 and no further compression of the spring 32 will be available.

Likewise, the portion of the spring 33 that extends out of the sleeve portion 42 is also sufficient to provide for 12° of compression. Again, once that 12° compression of spring 33 has been made, the spring 33 is completely within the sleeve portion 42.

The straight spring 34 is a high torque rating spring compared to the curved springs 32 and 33. In the arrangement illustrated in FIG. 2, the spring 34 can provide up to 6° of compression prior to the bosses 44 and 45 coming into engagement. Once the bosses 44 and 45 engage, no further compression of the straight spring 34 is available.

It follows, that the maximum compression of the spring arrangement 30 as illustrated is a 30° compression. The expectation is that 30° of compression will only be required in very extreme circumstances, and in the majority of circumstances, full compression of the straight spring 34 will not be required. Thus, the majority of the compression will be made through the respective curved springs 32 and 33.

The 30° compression which is available in the clockwise drive direction of the spring arrangement 30 is also available in the anticlockwise "over-run direction". Thus, the spring arrangement 30 is identical in available angular compression in each of clockwise drive and anticlockwise over-run compression.

Figure 4:
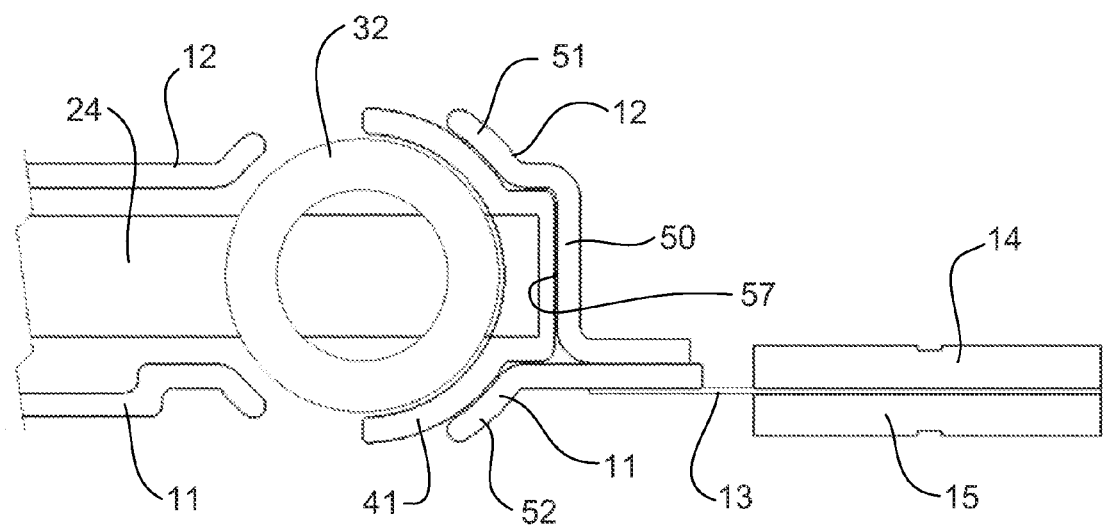

While FIG. 3 illustrates the sleeve portions 41 and 42 in perspective view, FIG. 4 illustrates that sleeve portion 41 in cross-section taken through IV-IV of FIG. 1. Thus, in FIG. 4, each of the main and side plates 11 and 12 are illustrated, along with the hub flange 24. A curved spring 32 is shown and it can be seen from FIG. 4, that the sleeve portion 41 is interposed between the spring 32 and the facing and concave channel formed by the main and side plates 11 and 12. The spring 32 is seated in a recess in the hub flange 24 with one end face 37 of the recess visible through the middle of the spring 32. The sleeve 41 has a U-shape cross-section and the engaging surfaces of the sleeve 41 with the spring 32 and the main and side plates 11 and 12 are formed complementary to the profile of those surfaces. It can be seen for example, that the main and side plates 11 and 12 form a recessed base 50 and a pair of side walls 51 and 52, and the facing surface of the sleeve 41 has a substantially complementary shape. The recessed base 50 and the complementary profile of the sleeve 41 assists to locate the sleeve 41 relative to the plates 11 and 12. The surfaces of the base 50 and the side walls 51 and 52 in contact with facing surfaces of the sleeve portion 41 form a bearing surface 57.

Further arrangements within the scope of the present invention are illustrated in FIGS. 5 to 10, in the schematic manner illustrated in FIG. 2.

Figure 5:
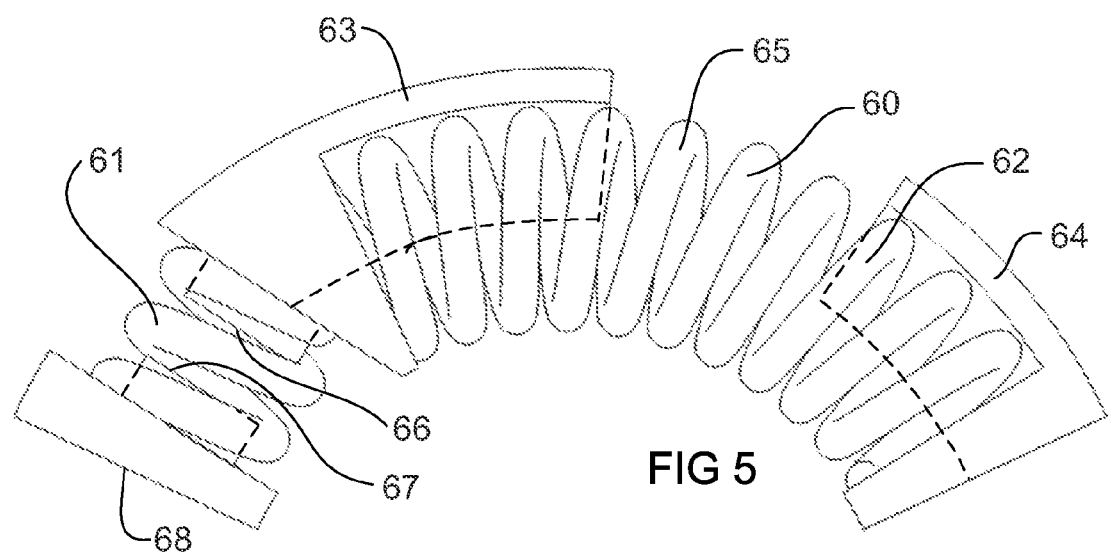
FIGS. 5 to 10 are schematic drawings of further drive spring arrangements according to the invention.

With reference to FIG. 5, a drive spring arrangement 60 is illustrated comprising a first straight spring 61 and a second curved spring 62. The first straight spring 61 has a lower torque rating than the second curved spring 62. A sleeve arrangement is provided about the curve spring 62 and comprises sleeve portions 63 and 64. The sleeve portion 63 is disposed at the end of the curved spring 62 adjacent the straight spring 61, while the sleeve portion 64 is disposed at the opposite end of the spring 62. The sleeve portions 63 and 64 are spaced apart to leave an intermediate and central portion 65 of the spring 62 outside of the portions 63 and 64. The central spring portion 65 provides a maximum compression of 20° in both drive and over-run directions of compression. Upon 20° compression of the spring 62, the sleeve portions 63 and 64 will come into abutment and will form a continuous sleeve, and will prevent further compression of the spring 62.

The sleeve portion 63 includes a boss 66 that projects into the centre of the straight spring 61 and faces a boss 67 of an end abutment 68, and the spacing between the respective bosses 66 and 67 is arranged to provide up to 10° of compression in the spring 61. Because of the difference in torque rating, the spring 62 will compress fully before the spring 61. The drive spring 60 thus provides a maximum of 30 degrees of compression in each of the drive and over-run conditions.

Figure 6:
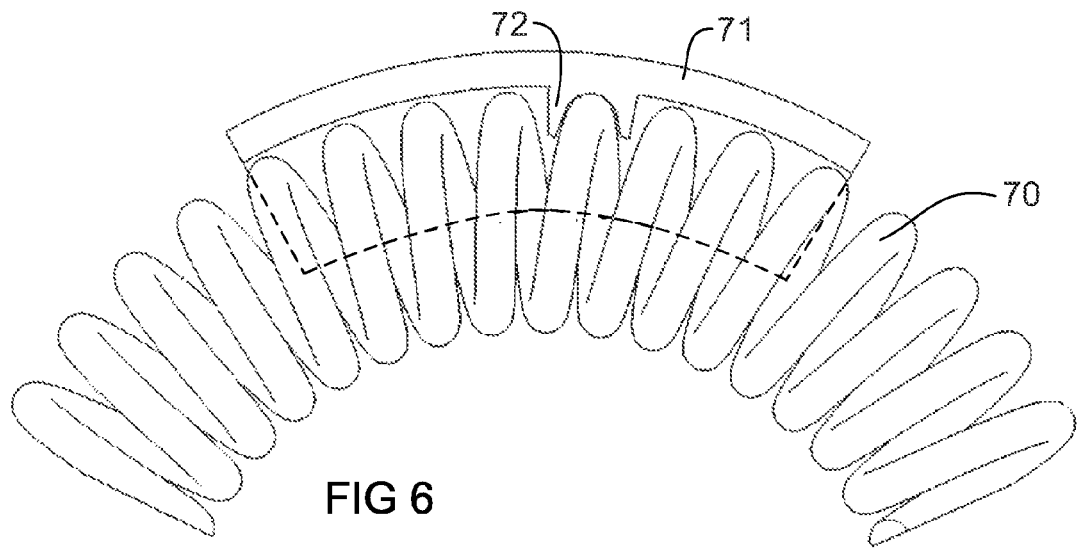

With reference to FIG. 6, the arrangement depicted in that figure illustrates a single curved drive spring 70 and includes a single sleeve 71 disposed centrally of the length of the spring 70 and which includes an inwardly extending grooved member 72 which includes a groove for accepting a coil of the spring 70 for locating the sleeve 71 relative to the coil 70.

Opposite ends of the spring 70 extend beyond the sleeve 71 and in the embodiment illustrated, compression of up to 30° in each of the drive and over-run directions of compression is available. The arc of compression shown in FIG. 6 does not extend fully to the end of the sleeve 71 and this is intended to show that conventional stop pins can be used in the invention to terminate spring compression rather than using the sleeve ends for that purpose.

Figure 7:
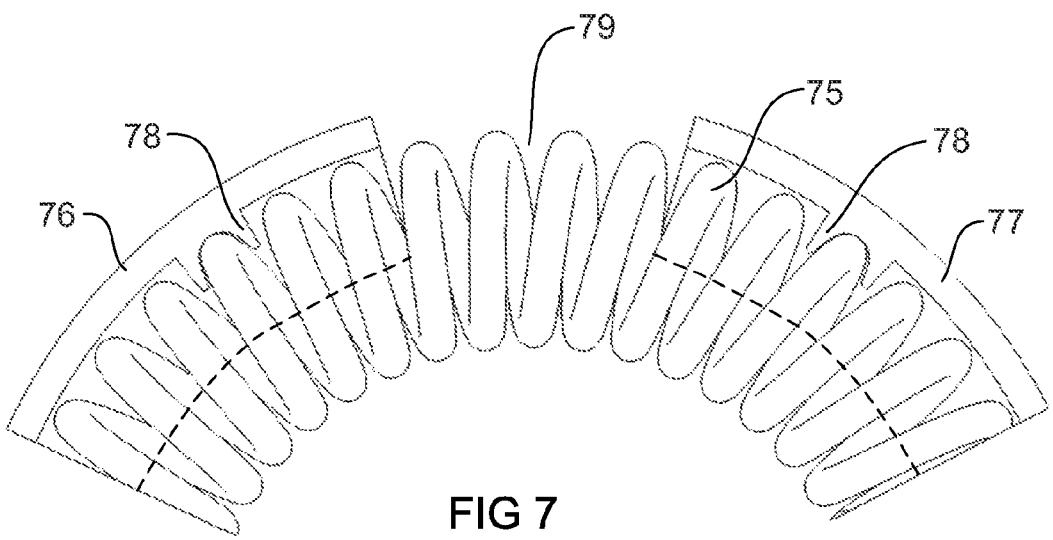

FIG. 7 illustrates a curved drive spring 75 and a pair of sleeve portions 76 and 77. The sleeves 76 and 77 each include a grooved member 78 equivalent to the groove member 72 of FIG. 6, so that each grooved member 78 accepts a single coil of the drive spring 75 to locate the sleeve portions on the spring 75.

The sleeve portions 76 and 77 extend from opposite ends of the drive spring 75 towards the centre of the drive spring 75. The central or intermediate portion 79 of the drive spring 75 is exposed outside of each of the sleeve portion 76 and 77 and prior to facing ends of the sleeve portions 76 and 77 engaging upon compression of the drive spring 75, the drive spring 75 has up to 30° compression in each of the drive and over-run directions of compression.

Figure 8:
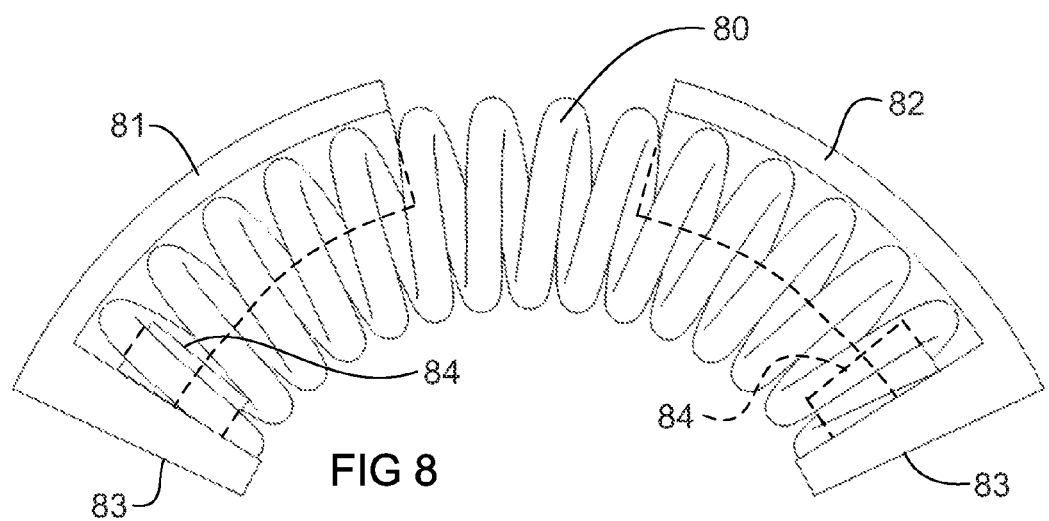

FIG. 8 illustrates an arrangement substantially similar to the arrangement of FIG. 7, and thus illustrates a drive spring 80 and a pair of. Where the arrangement of FIG. 8 differs from that of FIG. 7, is in relation to the manner in which the sleeve portions 81 and 82 are held securely to the drive spring 80. In FIG. 8, each of the sleeve portions 81 and 82 includes an end abutment 83 and an inwardly facing boss 84 that extends into the ends of the spring 80 to locate the sleeve portion on the spring 80. The arrangement of FIG. 8 can provide up to 30° compression in each of the driver and over-run modes.

Figure 9:
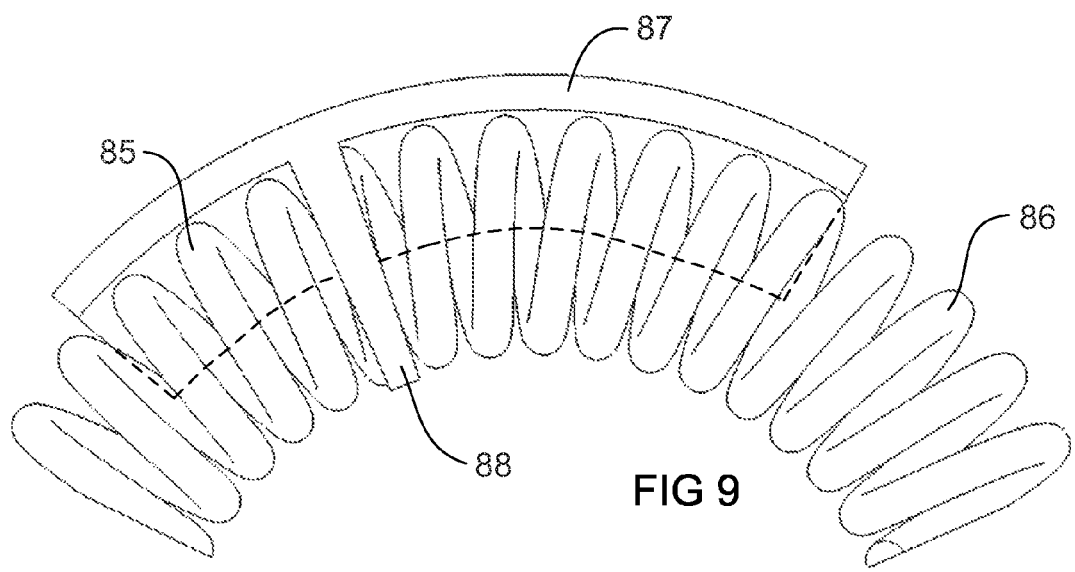

The arrangement in FIG. 9 includes a pair of springs, comprising a high torque, low angle spring 85 and a low torque, high angle spring 86. Each of the springs 85 and 86 is curved. A sleeve 87 is disposed about the springs 85 and 86 along a portion of their length, and an inwardly extending abutment 88 extends from the sleeve and is interposed between facing ends of the springs 85 and 86. The abutment 88 can include oppositely facing bosses that extend into the springs 85 and 86 for locating the sleeve 87 relative to the springs 85 and 86.

A portion of each of the springs 85 and 86 extends from the sleeve 87. The portion of the spring 85 that extends from the sleeve 87 provides for a 10° compression, while the portion of the spring 86 that extends from the sleeve 87 provides for 20° compression. The maximum compression is thus 30° and this applies in both drive and over-run modes.

The use of high and low torque springs 85 and 86 affects the manner in which compression of the springs occurs. In the arrangement of FIG. 9, the spring 86 will compress fully into the sleeve 87, before full compression of the spring 85 occurs. Some compression of the spring 85 will occur as the spring 86 is compression, but that depends on the stiffness of each of the springs. Once each of the springs 85 and 86 has been compressed fully into the spring 87, no further compression is available.

Figure 10:
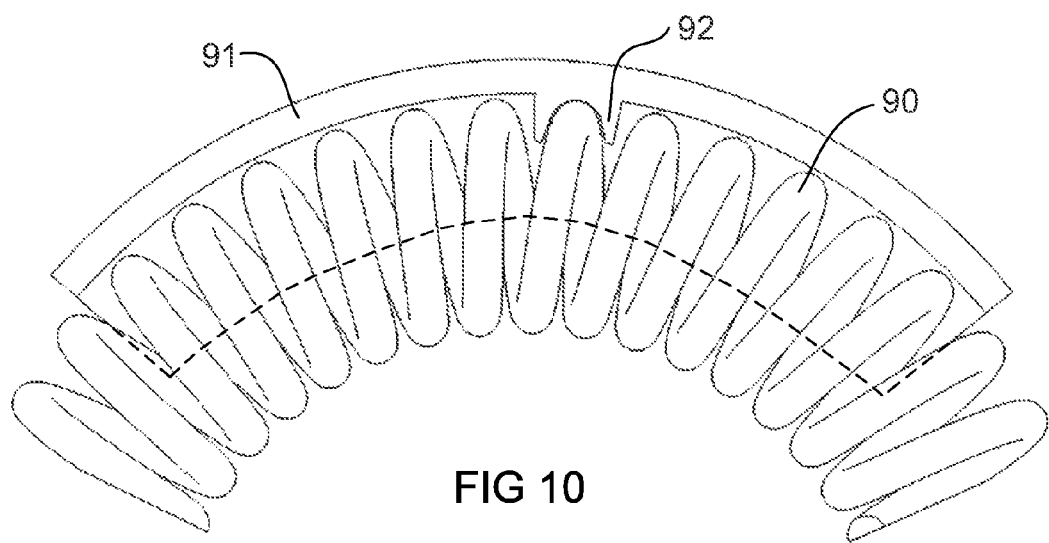

FIG. 10 illustrates an arrangement which is very similar to that of FIG. 6, and thus in FIG. 10, a spring 90 is shown disposed partially within a sleeve 91. The sleeve 91 is fixed to the spring 90 by an inwardly extending grooved member 92, although the member 92 is much shorter than the member 72 of FIG. 6.

In FIG. 10, the ends of the spring 90 that protrude from the sleeve 91 each provide 15° compression. Compression is terminated when the spring ends have fully entered the sleeve 91. Thus, the arrangement provides 30° maximum compression in both drive and over-run modes.

In each of the embodiments illustrated in the figures, compression and expansion of the drive springs involves movement of the springs relative to the sleeves and movement of the sleeves relative to the plate assembly, in particular the bearing surface 57 of the plate assembly shown in FIG. 4.

The invention described herein is susceptible to variations, modifications and/or additions other than those specifically described and it is to be understood that the invention includes all such variations, modifications and/or additions which fall within the spirit and scope of the present disclosure.

Throughout the description and claims of this specification the word "comprise" and variations of that word, such as "comprises" and "comprising", are not intended to exclude other additives, components, integers or steps.

The claims defining the invention are as follows:

1. A clutch plate including:
a plate assembly comprising axially spaced first and second plates and having an annular periphery extending from the first plate to which an assembly of friction material is applied to face in each of opposite directions,
a hub for connection to an output shaft,
a hub flange positioned between the first and second plates and being drivable by the plate assembly to rotate,
the hub being drivable to rotate by the hub flange,
the plate assembly and the hub flange being angularly displaceable relative to each other and being coupled together by at least two drive springs, which are positioned equidistantly about the hub, the drive springs being formed by first and second curved compression springs which are arranged in series and which are separated by a straight spring of relatively short length compared to the first and second curved springs, the first and second curved springs being of substantially the same length and of a substantially constant radius of curvature and being mounted concentric about the hub so that the drive spring formed by the first and second curved springs and the straight spring is of substantially constant radius of curvature, each of the curved springs being of low torque relative to the straight spring, the drive springs being at least partly positioned between the first and second plates, each end of the drive springs being in engagement with an abutment of the hub flange and an abutment of the plate assembly, the drive springs applying a biasing load against relative angular displacement between the plate assembly and the hub flange, a sleeve extending about a portion of the length of each of the drive springs, the sleeve of each drive spring being formed in two sleeve portions of which a first sleeve portion is disposed about a portion of the length of the first curved spring and the second sleeve portion is disposed about a portion of the length of the second curved spring and whereby another portion of the length of each of the drive springs extends out of the sleeve, and the sleeve being interposed between a radially outer surface of the springs and a facing bearing surface formed by the plate assembly, the springs being movable within the sleeves relative to the sleeves and the sleeves being movable relative to the bearing surface of the plate assembly.

2. A clutch plate according to claim 1, each sleeve being generally U-shaped in cross-section and being open facing radially inwardly.

3. A clutch plate according to claim 1, each sleeve having a curved inner surface which is curved at substantially the same radius of curvature as the outer surface of the spring.

4. A clutch plate according to claim 3, the curved inner surface extending from the radially outermost point of the springs for at least 45° on either side of the radially outermost point, so that the curved inner surface extends for a total of 90°.

5. A clutch plate according to claim 3, the curved inner surface extending from the radially outermost point of the springs for at least 90° on either side of the radially outermost point so that the curved inner surface extends for a total of 180°.

6. A clutch plate according to claim 1, the bearing surface being a concave surface.

7. A clutch plate according to claim 6, the bearing surface having a base surface and a pair of diverging wall surfaces and the facing surface of the sleeve being formed substantially the same as the bearing surface.

8. A clutch plate according to claim 7, the base surface extending substantially tangential to the hub and the diverging wall surfaces extending from the base surface at approximately 60°.

9. A clutch plate according to claim 1, the first and second sleeve portions including an inwardly extending projection which is located between facing ends of the first and second curved springs and the straight spring to locate the sleeve portions and a portion of each of the first and second curved springs extending out of the sleeve portions at the ends of the first and second curved springs remote from the straight spring.

10. A clutch plate according to claim 9, the inwardly extending projection of each sleeve portion including an abutment and the respective abutments of each projection being aligned for abutment upon a predetermined compression of the straight spring.

11. A clutch plate according to claim 1, the first and second curved springs providing a maximum of about 12° of compression and the straight spring providing a maximum of about 6° of compression.

12. A clutch plate including:
a plate assembly comprising axially spaced first and second plates and having an annular periphery extending from the first plate to which an assembly of friction material is applied to face in each of opposite directions,
a hub for connection to an output shaft,
a hub flange positioned between the first and second plates and being drivable by the plate assembly to rotate,
the hub being drivable to rotate by the hub flange,
the plate assembly and the hub flange being angularly displaceable relative to each other within a predetermined range and being coupled together by at least two drive springs, which are positioned equidistantly about the hub and which are mounted concentric about the hub and each drive spring being formed by a first curved compression spring and a second straight compression spring, whereby the straight spring is of relatively short length compared to the curved spring so that the drive springs formed by the curved spring and the straight spring are of substantially constant radius of curvature, and the curved spring being of low torque relative to the straight spring, the drive springs being at least partly positioned between the first and second plates, each end of the drive springs being in engagement with an abutment of the hub flange and an abutment of the plate assembly, the drive springs applying a biasing load against relative angular displacement between the plate assembly and the hub flange,
a sleeve extending about a portion of the length of each of the drive springs so that a portion of each of the drive springs extends out of the sleeve, and the sleeve being interposed between a radially outer surface of the springs and a facing bearing surface formed by the plate assembly, the springs being movable within the sleeves relative to the sleeves and the sleeves being movable relative to the bearing surface of the plate assembly, and
the sleeve of each drive spring including an inwardly extending projection which is located between facing ends of the curved spring and the straight spring to locate the sleeve and a portion of the curved spring extending out of the sleeve at the end of the sleeve remote from the straight spring.

13. A clutch plate according to claim 12, the inwardly extending projection of the sleeve including an abutment which extends into the straight spring for engagement with a facing abutment upon a predetermined compression of the straight spring.

14. A clutch plate according to claim 12, the sleeve terminating prior to the end of the curved spring remote from the straight spring and an end sleeve being applied to the end of the curved spring remote from the straight spring, the end sleeve being spaced from the sleeve applied to the curved spring.

15. A clutch plate according to claim 12, the first curved spring providing a maximum of about 20° of compression and the straight spring providing a maximum of about 10° of compression.

* * * * *